S. ADELMAN.
OUTLET BOX SUPPORTING BRACKET FOR ELECTRIC WIRING FIXTURES.
APPLICATION FILED MAR. 15, 1910.
982,110.
Patented Jan. 17, 1911.
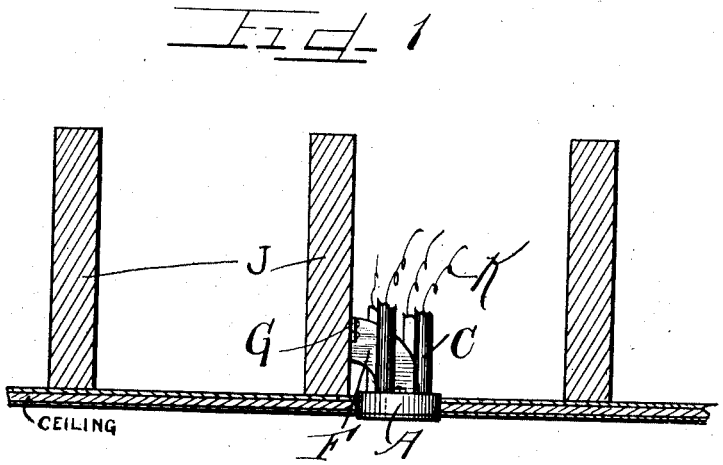
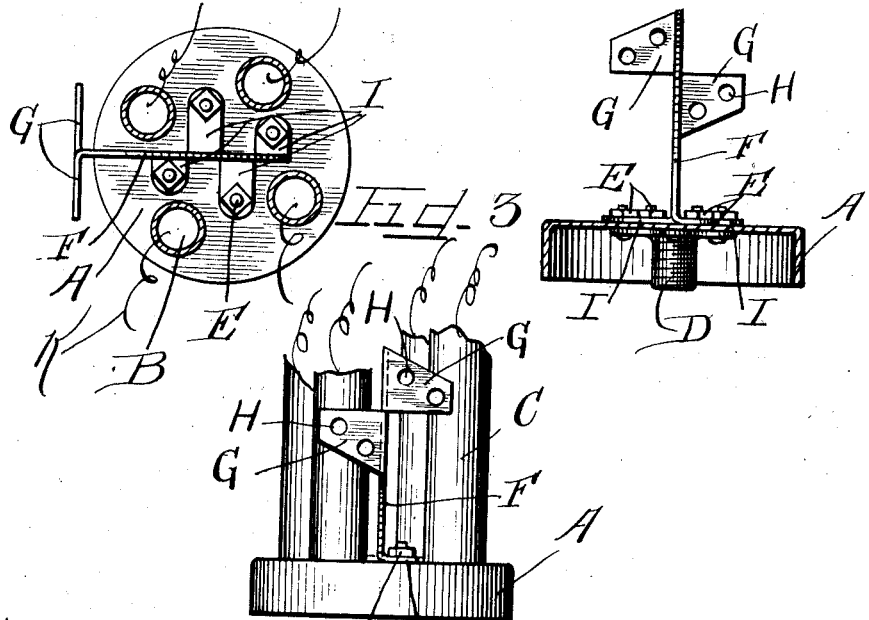

UNITED STATES PATENT OFFICE.

SOL ADELMAN, OF CHICAGO, ILLINOIS.

OUTLET-BOX-SUPPORTING BRACKET FOR ELECTRIC-WIRING FIXTURES.

982,110.   Specification of Letters Patent.   Patented Jan. 17, 1911.

Application filed March 15, 1910. Serial No. 549,513.

*To all whom it may concern:*

Be it known that I, SOL ADELMAN, a citizen of the United States, residing at Chicago, in the county of Cook and State of Illinois, (whose post-office address is 3543 Beach avenue, in said city,) have invented a new and useful Improvement in Outlet-Box-Supporting Brackets for Electric-Wiring Fixtures, of which the following is a specification.

My invention relates to a fastening or supporting device of what is known as an outlet box in the electric wiring fixture work. This outlet box is a device that is placed in the ceiling where connection is made to the electric wiring carried along above the ceiling with the electric fixtures down in the room, and the outlet box is a piece that makes the junction with the two sets of fixtures at the ceiling; and my invention relates to a desirable method of fastening or supporting this outlet box in the ceiling of the room or other locations where the same may be used: and the object of my invention is to furnish a cheap support or bracket which permits the full use of the outlet box and thus not in any manner limiting access to the box because of the means which are used in supporting the same in the ceiling.

Reference will be had to the accompanying drawings, in which—

Figure 1 is a vertical sectional elevation of the ceiling showing the outlet box and my support or bracket in position of use; Fig. 2 is a top plan view of the outlet box with my bracket attached; Fig. 3 is an elevation of Fig. 2; Fig. 4 is a sectional elevation from the reverse side of Fig. 3.

In the drawing, A indicates the ordinary outlet box, which varies in form somewhat, but is of substantially the same elementary construction as is here shown. This box is provided with apertures B which are closed with blind covers when the box comes from the makers, which blind covers of the holes may be forced out by the electrician to produce as many holes as he has occasion to use at any one fixture, but in the drawing four holes B are shown to be in use. The wires or cables, which go to the box above the ceiling or along the ceiling are shown as coming in to the box in the form of tubes C; which may be flexible tubes of metal or other suitable material, or may be the customary metal pipe which is used in electrical construction. Beneath the box and as a part of it there is a threaded nipple D, to which the electrical fixture or chandelier may be attached, which comes down into the room. Above the box and fastened thereto by screws E is a bracket F, which is made of a flat piece of metal stamped out, having the flanges G with the holes H and the lugs I provided with holes for the screws or bolts E. The flanges G are fastened to the joist by screws or nails through the holes H, which may be done easily and quickly. And in the case of a metal joist machine screws or bolts will be used. The bolts E, which fasten my bracket to the box A also fasten the screw nipple D, which is an economy of construction.

Heretofore the outlet boxes A have been fastened in various ways, the chief one of which has been to nail a narrow cross-piece between the joist and then through the bolt-holes, wherein bolts E are shown in the drawing, nails or screws are used to fasten the box to this cross-piece, and owing to the necessary width of this cross-piece as heretofore used it has obstructed the access to some of the holes B in the box and has thus limited the full use of the box and the fastening of this box to the cross-piece has been an expensive one of labor and the cross-piece is very much in the way of getting the wires K and tubing C above the ceiling to the box. With my bracket, being made as shown, much labor is saved in supporting the box in the ceiling and the full use of the box is secured and full access is permitted for the entrance of the tubes and wires.

What I claim is:

1. In a device of the class described, the combination with an outlet box, of a bracket having its body consisting of a thin web perpendicular to the box lying approximately in a plane diametrical with respect to the same, having one marginal portion rigidly secured to the box, and another marginal portion projecting beyond the side of the box and provided with means for securing it to a supporting structure.

2. In a device of the class described, the combination with an outlet box, of a thin metal bracket body perpendicular to the box in an approximately diametrical plane, rigidly secured thereto, and provided with means for attachment to a structure in another plane also perpendicular to the box.

3. In a device of the class described, the combination with an outlet box, of a bracket body lying in a plane perpendicular to the box in an approximately diametrical plane, having at one end lateral flanges rigidly secured to the broad face of the box, and further having at the opposite end lateral flanges perpendicular to both the plane of said body and the plane of said box and beyond the side of the latter.

4. In a device of the class described, the combination with an outlet box, of a supporting bracket consisting of a thin body perpendicular to the plane of the box, having one marginal portion flanged out upon the box and another marginal portion extending laterally beyond the side of the box and provided with attaching flanges, a fixture-receiving nipple within the box and provided with flanges resting against the bottom of the same, and screws passing through the bottom of the box and binding thereto both the bracket flanges and the nipple flanges, substantially as set forth.

5. In a device of the class described, the combination with an outlet box, of a sheet metal supporting bracket consisting of a plane, thin metal member perpendicular to the face of the box, having at one end portions bent oppositely from its plane and fixed to the broad face of the box, and at its opposite end portions similarly bent at right angles and adapted to be secured to a joist or the like at one side of the box, and at one side of its plane.

SOL ADELMAN.

Witnesses:
F. F. SCHAEFERS,
WM. THOMPSON.